(12) United States Patent
Siraisi et al.

(10) Patent No.: US 12,595,121 B2
(45) Date of Patent: Apr. 7, 2026

(54) CONTAINER TRANSPORT FACILITY

(71) Applicant: Daifuku Co., Ltd., Osaka (JP)

(72) Inventors: Tooru Siraisi, Tokyo (JP); Makoto Kawamoto, Tokyo (JP); Shota Aika, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 47 days.

(21) Appl. No.: 18/792,274

(22) Filed: Aug. 1, 2024

(65) Prior Publication Data

US 2025/0042653 A1 Feb. 6, 2025

(30) Foreign Application Priority Data

Aug. 3, 2023 (JP) ................................. 2023-126918

(51) Int. Cl.
| | |
|---|---|
| *B65G 1/04* | (2006.01) |
| *B65G 1/06* | (2006.01) |
| *B65G 1/137* | (2006.01) |
| *B65G 60/00* | (2006.01) |

(52) U.S. Cl.
CPC ......... *B65G 1/0421* (2013.01); *B65G 1/1378* (2013.01); *B65G 60/00* (2013.01); *B65G 1/065* (2013.01)

(58) Field of Classification Search
CPC .... B65G 1/065; B65G 1/0421; B65G 1/0492; B65G 1/137; B65G 1/1378; B65G 60/00
See application file for complete search history.

(56) References Cited

U.S. PATENT DOCUMENTS

| | | | |
|---|---|---|---|
| 6,505,093 B1 | 1/2003 | Thatcher et al. | |
| 2016/0001992 A1 | 1/2016 | Takao | |
| 2017/0313514 A1 * | 11/2017 | Lert, Jr. | ............... B65G 1/0492 |
| 2020/0017313 A1 | 1/2020 | Mori | |
| 2020/0048000 A1 * | 2/2020 | Siraisi | ................. B65G 1/0485 |
| 2020/0277137 A1 * | 9/2020 | Bastian, II | .............. B66F 9/065 |
| 2022/0144546 A1 | 5/2022 | Tendo et al. | |

(Continued)

FOREIGN PATENT DOCUMENTS

| | | | | |
|---|---|---|---|---|
| CN | 115055496 A | * | 9/2022 | ............... B09B 3/45 |
| EP | 2862818 A1 | * | 4/2015 | ......... G06Q 30/0621 |

(Continued)

*Primary Examiner* — James R Bidwell
(74) *Attorney, Agent, or Firm* — The Webb Law Firm

(57) ABSTRACT

A container transport facility includes a transport vehicle configured to transport a container that is configured to be step-stacked in an up-down direction; a storage shelf configured to store the container; and a work area in which target work is performed. A step-stacking storage area s provided at a location different from the work area and the storage shelf. The step-stacking storage area includes a disposition region in which a plurality of step-stacking container groups is able to be disposed, a second delivery portion in which the step-stacking container group is delivered between the second delivery portion and the support portion, and a container group transport device configured to perform a taking-out operation of moving the step-stacking container group from the disposition region to the second delivery portion and a taking-in operation of moving the step-stacking container group from the second delivery portion to the disposition region.

8 Claims, 12 Drawing Sheets

(56)                 References Cited

U.S. PATENT DOCUMENTS

| 2022/0363475 | A1 |   | 11/2022 | Iwata et al. |  |
|---|---|---|---|---|---|
| 2023/0356945 | A1 | * | 11/2023 | Minematsu | B65G 1/1378 |
| 2024/0017921 | A1 | * | 1/2024 | Fosnight | G06Q 10/087 |
| 2024/0092571 | A1 |   | 3/2024 | Hamaguchi et al. |  |

FOREIGN PATENT DOCUMENTS

| JP | 5992805 | A | 5/1984 |
|---|---|---|---|
| JP | 2001297140 | A | 10/2001 |
| JP | 6592711 | B1 | 10/2019 |
| TW | 201139252 | A1 | 11/2011 |
| TW | 1810317 | B | 8/2023 |
| WO | 2014142107 | A1 | 9/2014 |
| WO | 2022124141 | A1 | 6/2022 |

* cited by examiner

CONTAINER TRANSPORT FACILITY

CROSS-REFERENCE TO RELATED APPLICATION

This application claims priority to Japanese Patent Application No. 2023-126918 filed Aug. 3, 2023, the disclosure of which is hereby incorporated by reference in its entirety.

BACKGROUND OF THE INVENTION

1. Field of the Invention

The present invention relates to a container transport facility including a transport vehicle that transports a container that is configured to be step-stacked in an up-down direction, a storage shelf that stores the container, and a work area in which target work, which is at least one of taking-out work of an article from the container and inputting work of the article into the container, is performed.

2. Description of Related Art

Such a facility constitutes a part of a logistics system. In recent years, in the logistics system for which the demand has been increasing, various efforts have been made to realize smooth logistics.

As one of the efforts, for example, Japanese Patent Application Laid-Open No. 2001-297140 discloses that an article having a high storage and retrieval frequency among articles to be handled by a facility is provided such that the article is stored at a position from which the article is more easily retrieved than an article having a low storage and retrieval frequency. As a result, it is expected that transport efficiency in the facility is able to be improved. However, Japanese Patent Application Laid-Open No. 2001-297140 does not disclose a specific configuration for improving the transport efficiency.

SUMMARY OF THE INVENTION

In view of the above-described actual situation, there is a demand for realizing a container transport facility capable of improving a transport efficiency.

The technique for achieving the above object is as follows.

A container transport facility including a transport vehicle configured to transport at least one container that is configured to be step-stacked in an up-down direction; a storage shelf configured to store the container; and a work area in which target work, which is at least one of taking-out work of an article from the container and inputting work of the article into the container, is performed, in which the at least one container includes a plurality of containers, the storage shelf is configured to include a plurality of steps of a shelf portion that supports each container in the up-down direction, and store the plurality of containers in a state of being separated from each other, the transport vehicle includes a traveling body configured to travel, a support portion configured to be mounted on the traveling body and support the plurality of containers as at least one step-stacking container group which is a container group in a step-stacked state, a first transfer device configured to be mounted on the traveling body and transfer the containers between the storage shelf and the step-stacking container group supported by the support portion, and a second transfer device configured to be mounted on the traveling body and transfer the step-stacking container group, the work area is provided with a first delivery portion through which the step-stacking container group is delivered between the first delivery portion and the support portion, a step-stacking storage area is provided at a location different from the work area and the storage shelf, and the at least one step-stacking container group includes a plurality of step-stacking container groups, the step-stacking storage area includes a disposition region in which the plurality of step-stacking container groups are able to be disposed, a second delivery portion in which the step-stacking container group is delivered between the second delivery portion and the support portion, and a container group transport device configured to perform a taking-out operation of moving the step-stacking container group from the disposition region to the second delivery portion and a taking-in operation of moving the step-stacking container group from the second delivery portion to the disposition region.

According to the present configuration, the step-stacking storage area is able to be used to temporarily store the step-stacking container group.

Therefore, for example, by storing a specific container in the step-stacking storage area, such as a container for which transportation to the work area is scheduled or a container with a high frequency to be transported to the work area, the work frequency of the transport vehicle for returning the container to the storage shelf or taking out the container from the storage shelf is able to be suppressed to be small.

Therefore, it is easy to improve the transport efficiency of the container by the transport vehicle. In addition, according to the present configuration, since the step-stacking storage area stores the step-stacking container group, the plurality of containers in a step-stacked state is able to be transferred at once between the support portion of the transport vehicle and the second delivery portion of the step-stacking storage area. Further, the delivery of the step-stacking container group is performed even in the first delivery portion of the work area. Therefore, it is easy to improve the transport efficiency of the container by the transport vehicle even at these points.

Further features and advantages of the technique according to the present disclosure will be more clearly understood from the following exemplary and non-limiting description of the embodiments with reference to the accompanying drawings.

3

Figure 8:
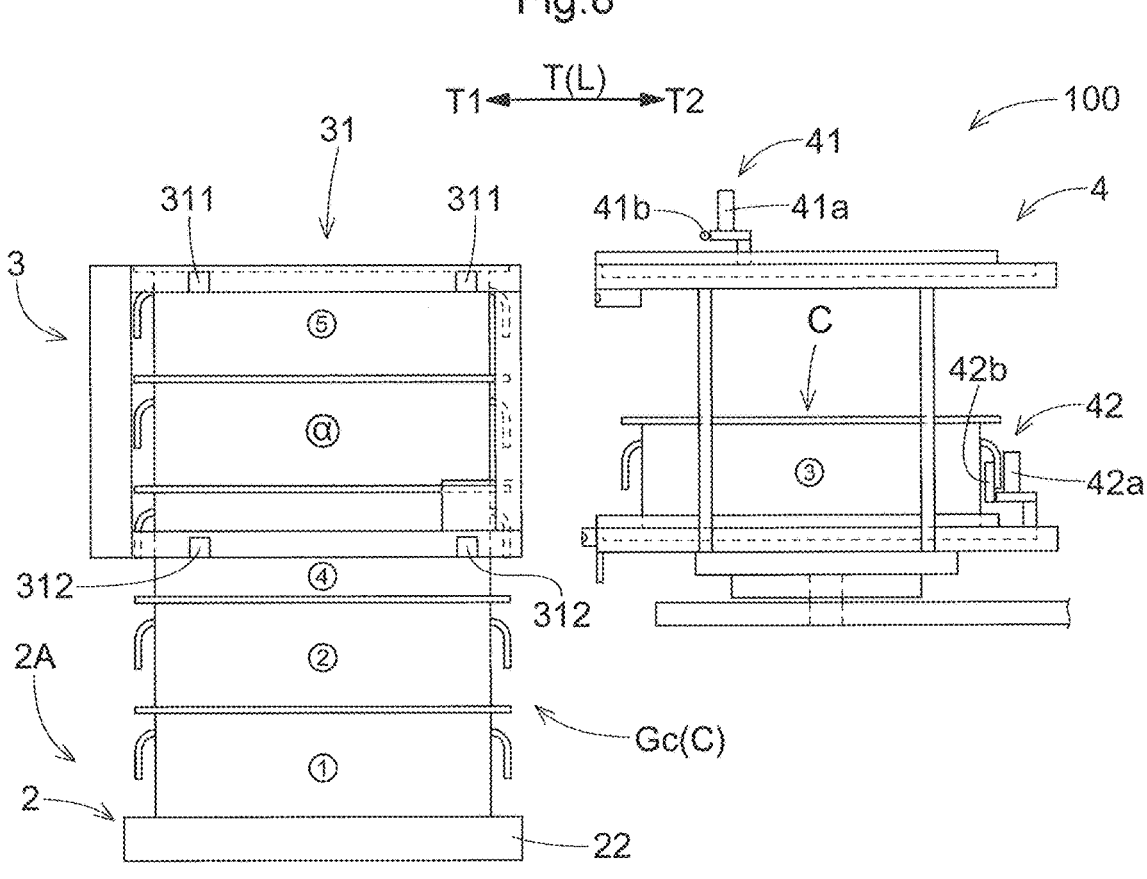
Figure 9:
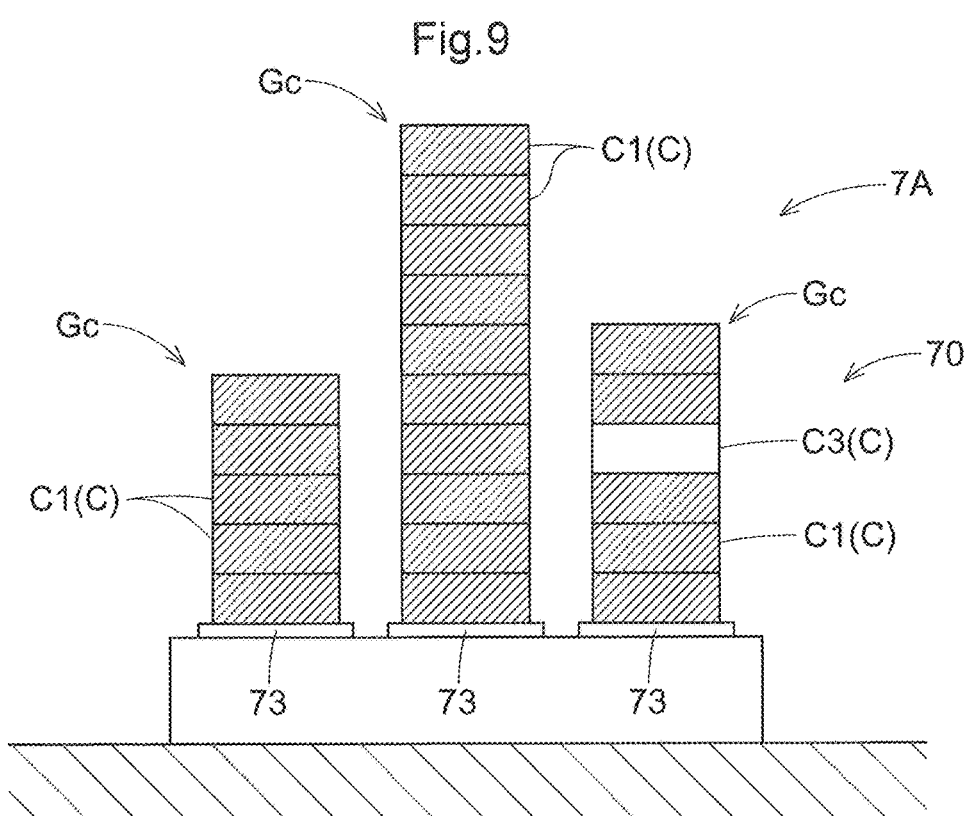
Figure 10:
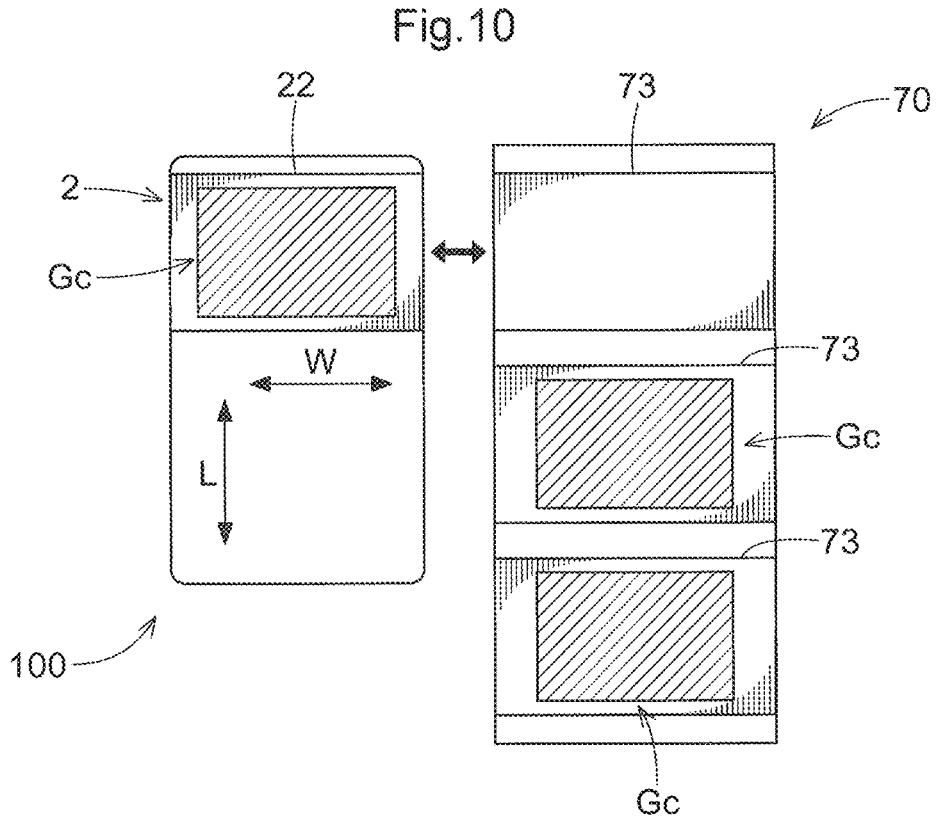
Figure 11:
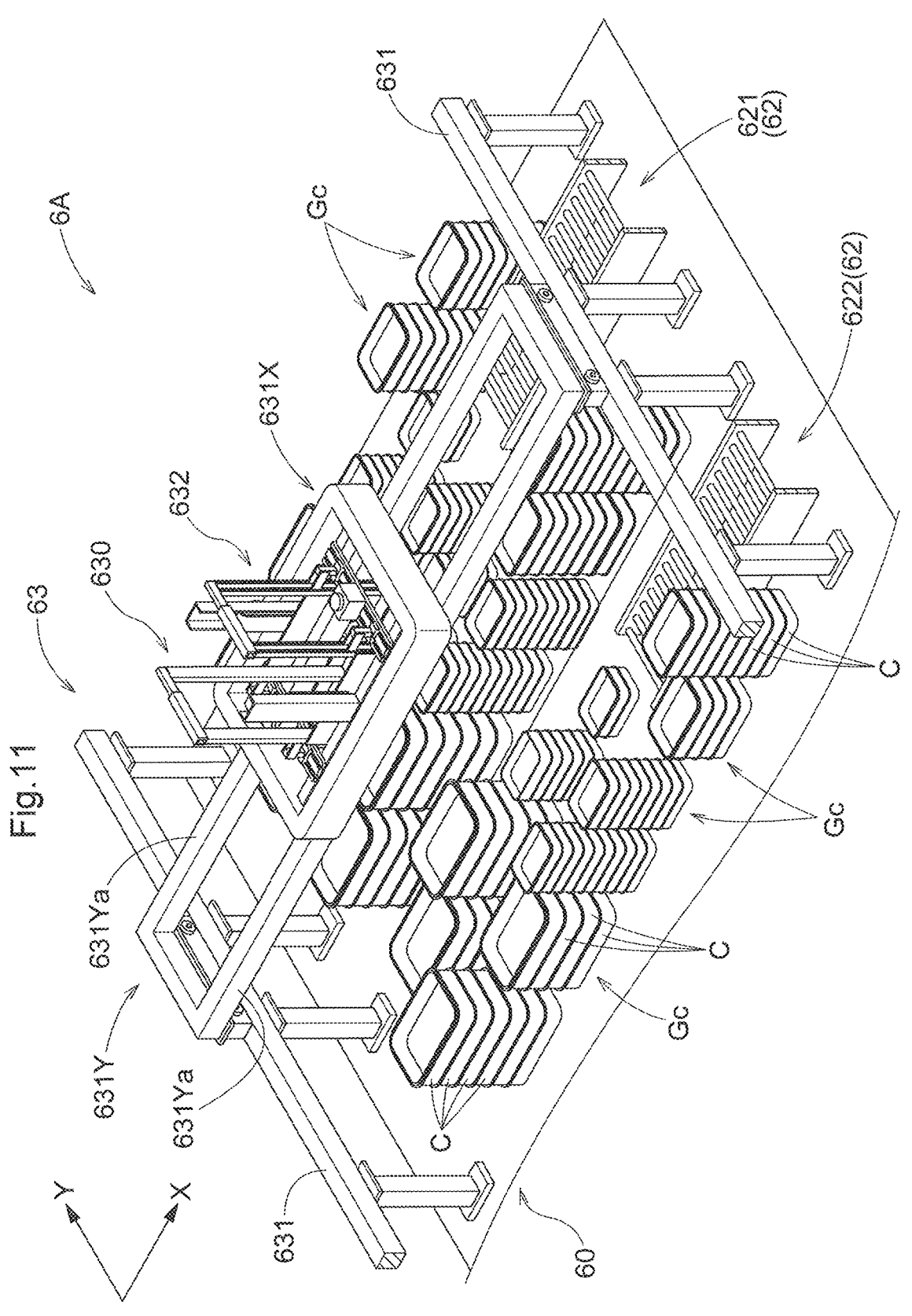
Figure 12:
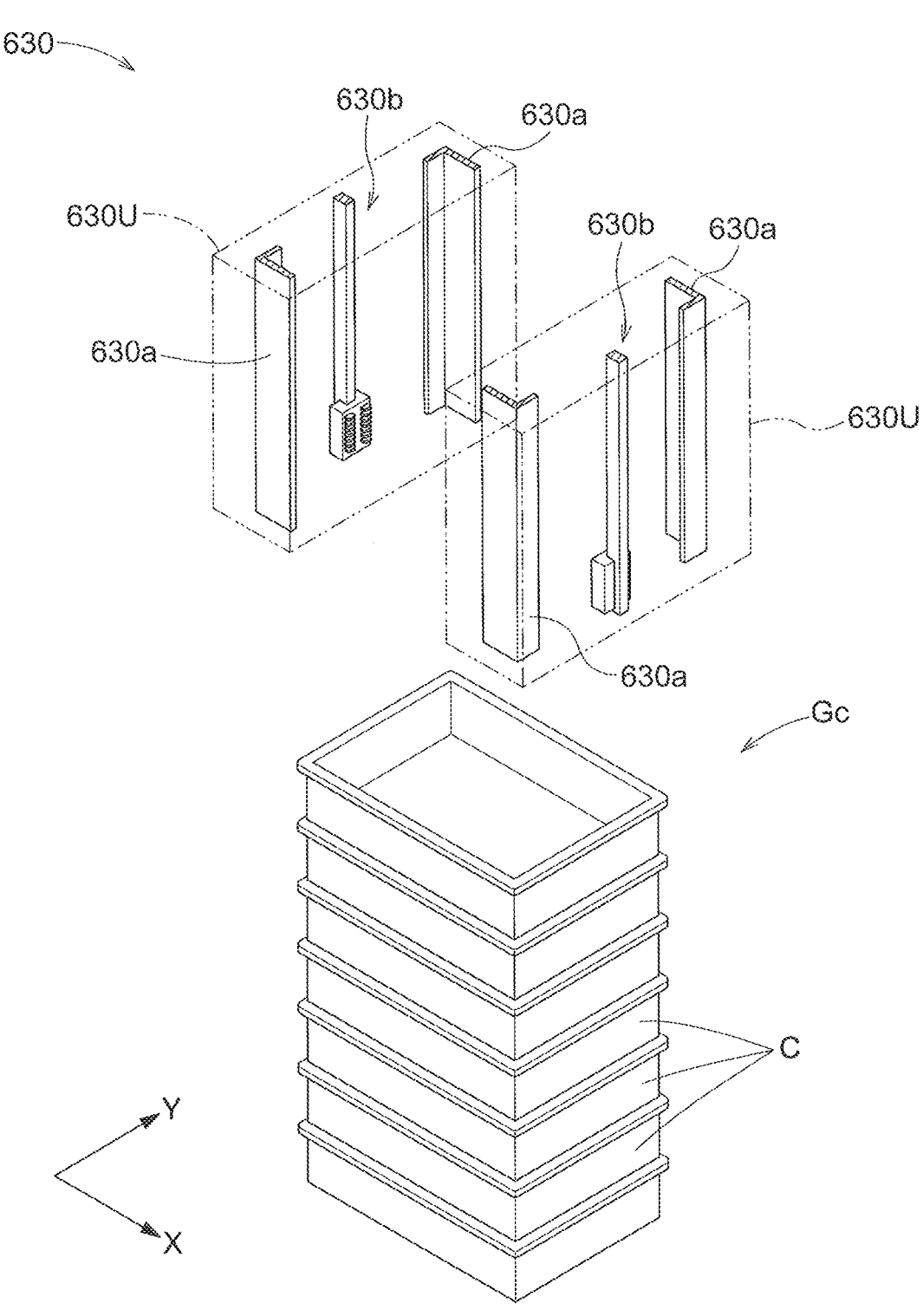
Figure 13:
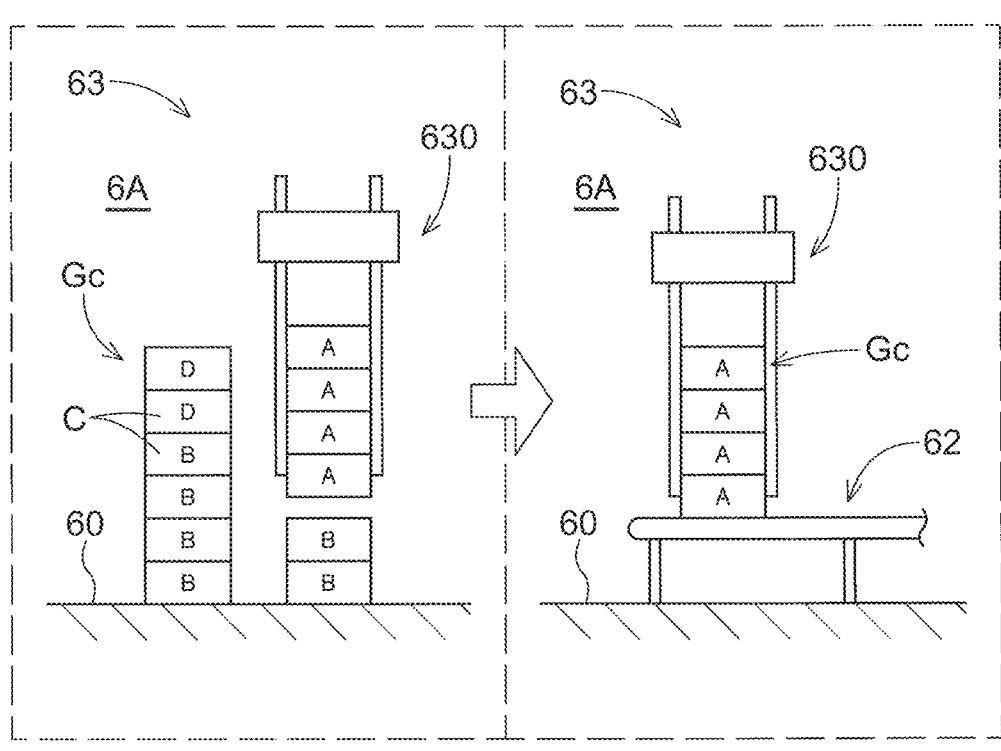
Figure 14:
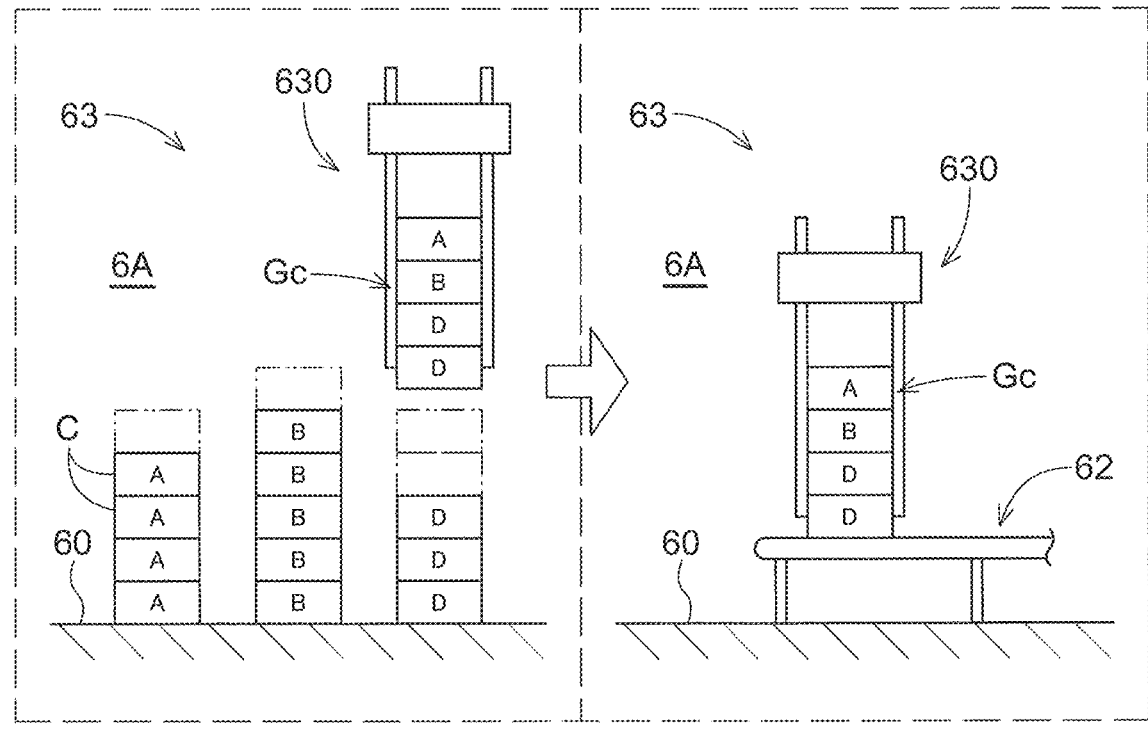
Figure 15:
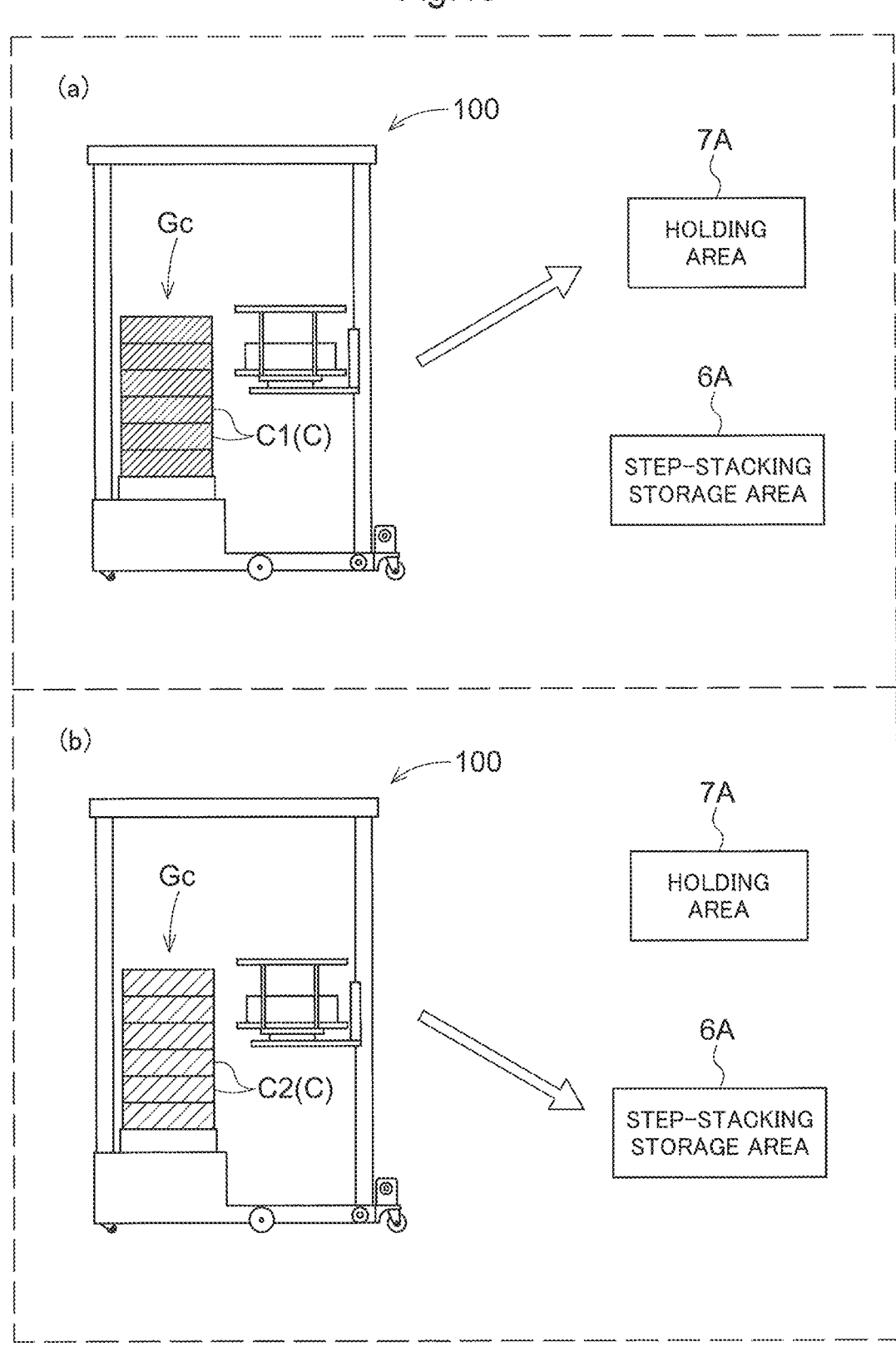
Figure 16:
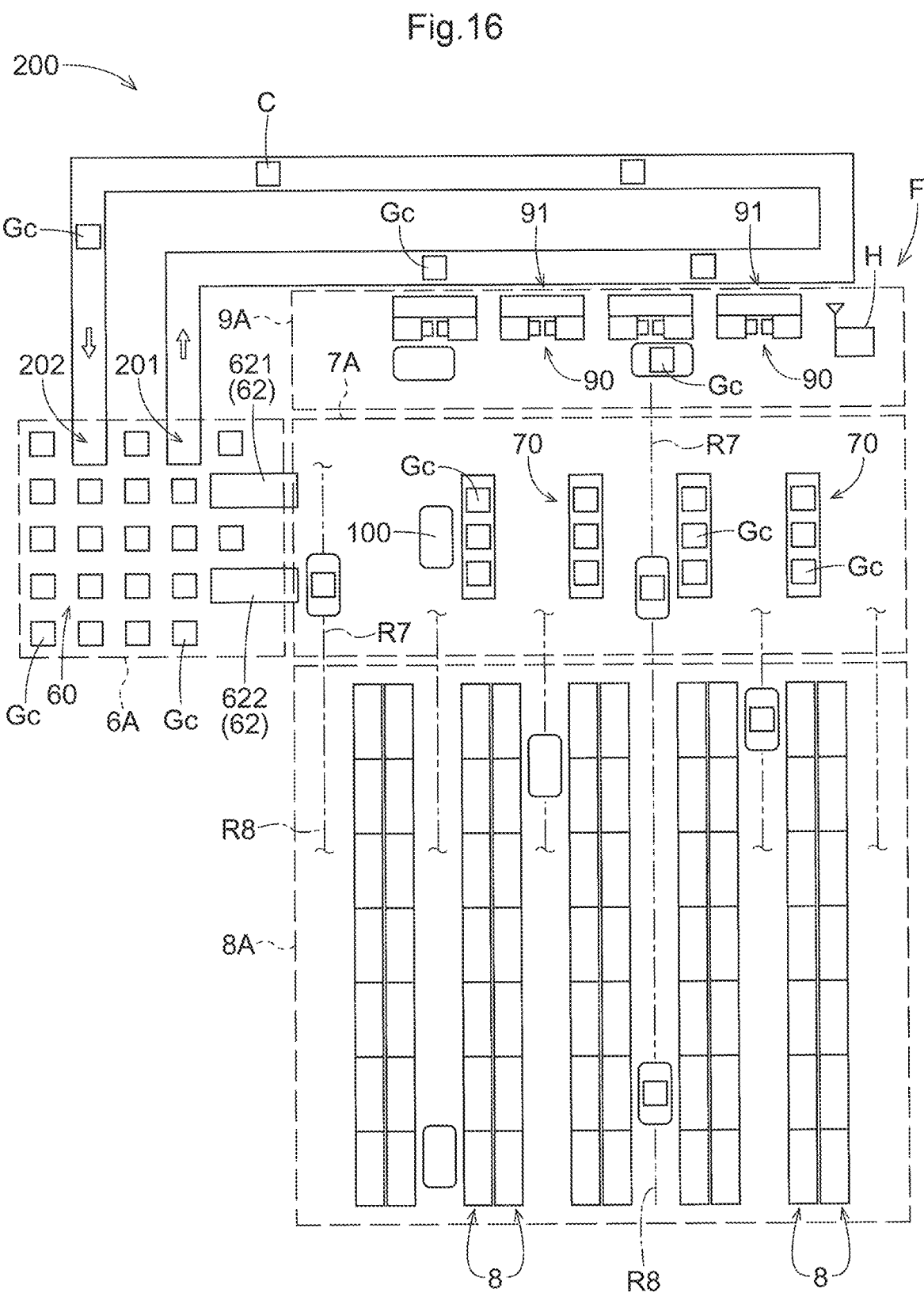

FIG. 8 is a view illustrating the transfer operation to the step-stacking region;

FIG. 9 is a view illustrating a holding portion in a holding area;

FIG. 10 is a plan view illustrating a state of transfer of a step-stacking container group between the transport vehicle and the holding portion;

FIG. 11 is a perspective view of a step-stacking storage area;

FIG. 12 is a view illustrating an operation of a gripping mechanism;

FIG. 13 is a view illustrating a separation operation of a container by a container group transport device;

FIG. 14 is a view illustrating a combination operation of the containers by the container group transport device;

FIG. 15 is a view illustrating an example of a transport destination of the step-stacking container group by a transport vehicle; and FIG. 16 is a plan view of a container transport facility according to a second embodiment.

DESCRIPTION OF THE INVENTION

First Embodiment

First, a first embodiment of a container transport facility will be described.

Figure 1:
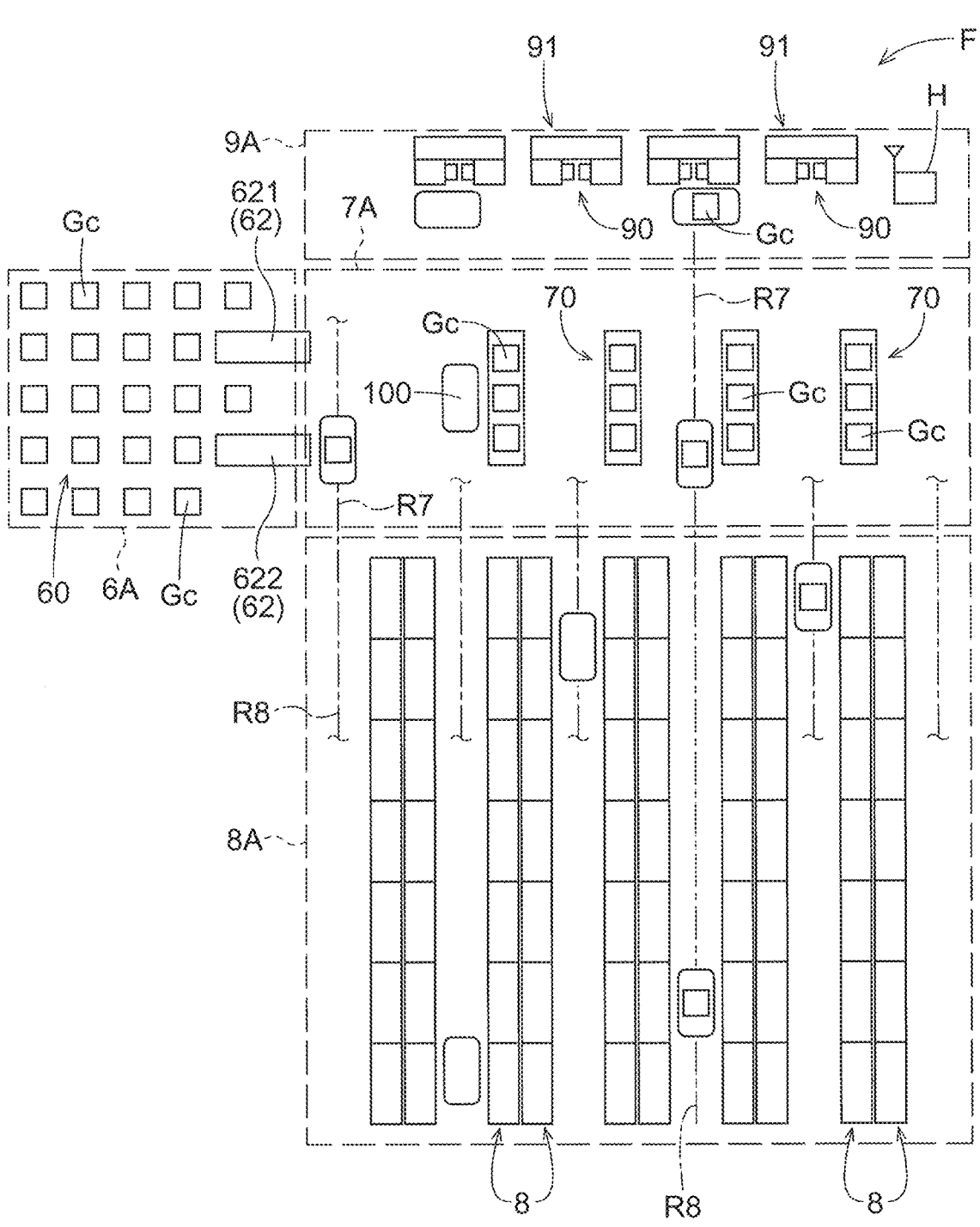
FIG. 1 is a plan view of a container transport facility.

As illustrated in FIG. 1, a container transport facility F includes a transport vehicle 100 that transports a container C (see FIG. 2), a storage shelf 8 that stores the container C, and a work area 9A in which target work, which is at least one of taking-out work of an article (not illustrated) from the container C and inputting work of the article into the container C, is performed. In the present embodiment, the container transport facility F includes a storage area 8A. A plurality of storage shelves 8 are provided in the storage area 8A. In addition, the container transport facility F further includes a control device H that controls the transport vehicle 100. In the present specification, the control device H corresponds to a "control system". However, the control device H may constitute at least a part of the control system. The control device H is configured to perform communication with a transport vehicle control unit (not illustrated) mounted on each of a plurality of transport vehicles 100 (see also FIG. 3).

The container C is configured to accommodate an article. The container C has a shape in which an upper side is open. The article is put into an inside of the container C via an upper opening portion of the container C or taken out from the inside of the container C. The article includes, for example, various products such as food products and daily necessities, or components and workpieces used in a production line of a factory and the like. One container C is configured to accommodate the same type of article.

Figure 4:
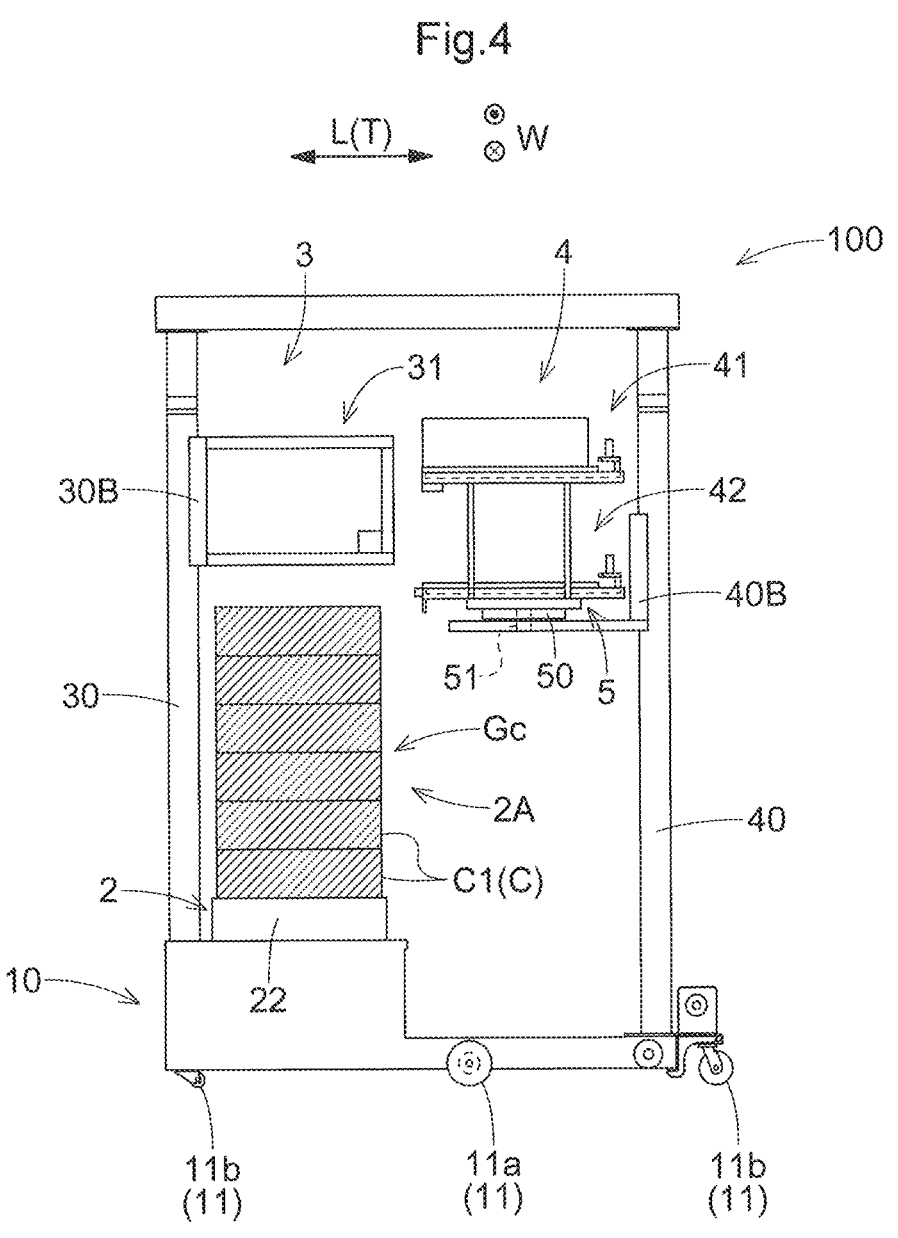
FIG. 4 is a view of a transport vehicle in a vehicle body width direction.

The container C is configured to be step-stackable in an up-down direction in a state in which the article is accommodated therein (see FIG. 4 and the like). A plurality of containers C are step-stacked in the up-down direction to form a step-stacking container group Gc. In the present example, a bottom portion of the container C is fitted from above to the opening portion of the other container C, so that the two containers C are step-stacked in the up-down direction.

The work area 9A is provided with a first delivery portion 91 through which the step-stacking container group Gc is delivered between the first delivery portion 91 and a support portion 2 (see FIG. 4) of the transport vehicle 100. The first delivery portion 91 carries in and carries out the container C. The transport vehicle 100 transports the container C carried in to the first delivery portion 91 to the storage shelf 8, or transports the container C stored in the storage shelf 8 to the first delivery portion 91 for carrying out.

In the present embodiment, a separation device 90 that separates respective containers C constituting the step-stacking container group Gc is provided in the work area 9A. The step-stacking container group Gc handed over to the first delivery portion 91 is separated into a plurality of containers C by the separation device 90. In the work area 9A, for each of the separated plurality of containers C, taking-out work of the article from the container C or inputting work of the article into the container C is performed. However, the separation device 90 is not an essential configuration. The separation of respective containers C from the step-stacking container group Gc may be performed by hand.

In the present embodiment, the plurality of storage shelves 8 are disposed in parallel to each other with a predetermined interval therebetween. At least a front surface of each of the plurality of storage shelves 8 is open, and the container C is taken in and out on the front surface. In the present example, a pair of storage shelves 8 are disposed in a state in which rear surfaces thereof face each other and are close to each other. A plurality of sets of the pair of storage shelves 8 of which the rear surfaces face each other are disposed in the storage area 8A.

A part of a travel path of the transport vehicle 100 is set to extend along each of the plurality of storage shelves 8. In the present embodiment, the path of the transport vehicle 100 extending along the storage shelf 8 is defined as a shelf region inner path R8. The transport vehicle 100 is able to travel in the shelf region inner path R8, so that it is possible to perform the movement in the storage area 8A and the transfer of the container C to the storage shelf 8. In the present example, the shelf region inner path R8 is provided along the front surface (surface on which the container C is taken in and out) of each of the plurality of storage shelves 8. In the pair of storage shelves 8 disposed to face each other on the front surfaces, one shelf region inner path R8 is shared.

Figure 2:
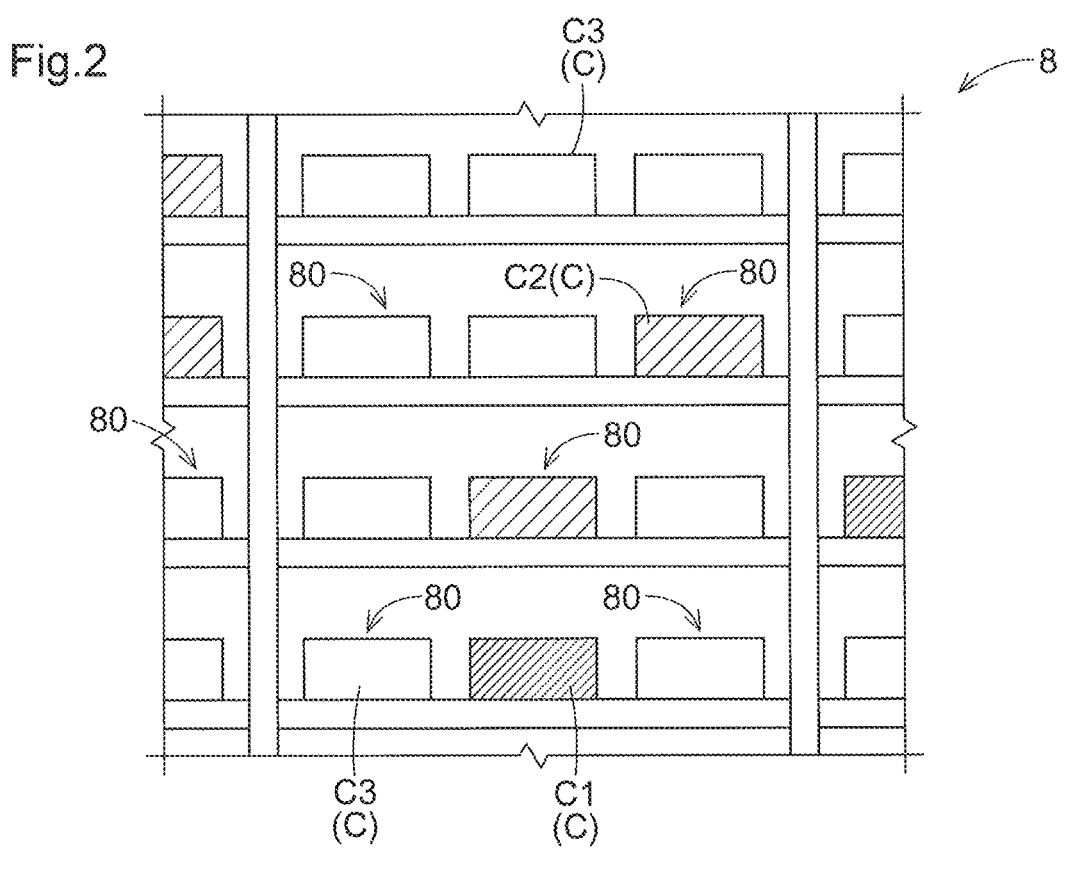
FIG. 2 is a front view of a storage shelf.

As illustrated in FIG. 2, the storage shelf 8 is configured to include a plurality of steps of a shelf portion 80 that supports each container C in the up-down direction, and store the plurality of containers C in a state of being separated from each other. A plurality of shelf portions 80 are provided in each step. One container C is able to be stored in each of the plurality of shelf portions 80.

Figure 3:
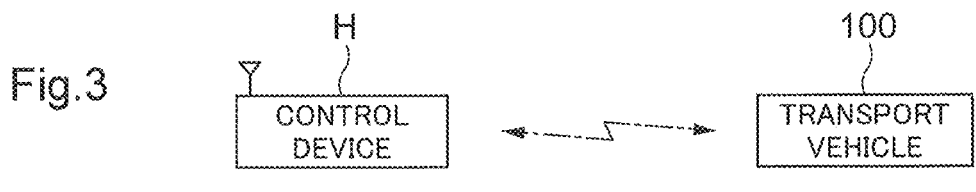
FIG. 3 is a control block view.
Figure 3:
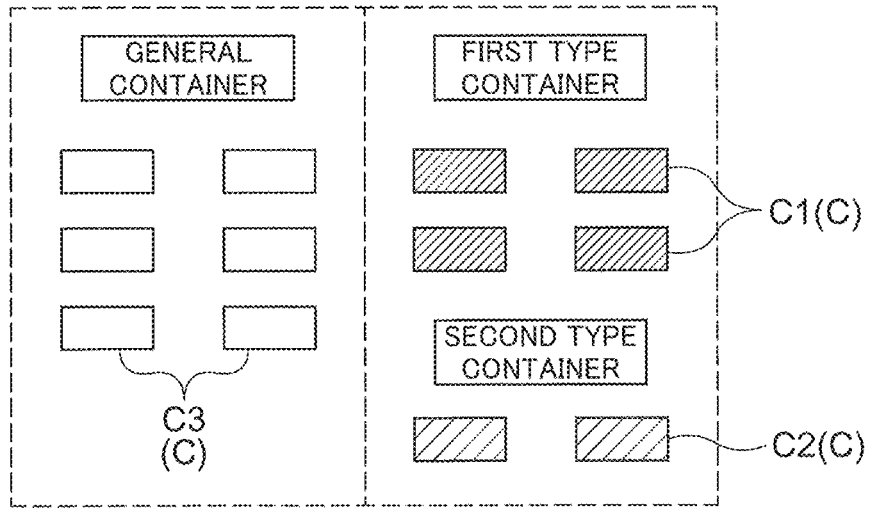

As illustrated in FIG. 3, the control device H is configured to be communicable with the transport vehicle 100. The control device H is configured to allow the transport vehicle 100 to perform a transport instruction that designates the container C of a transport target, and a transport source and a transport destination of the container C. The control device H includes, for example, a processor such as a microcomputer, peripheral circuits such as a memory, and the like. Then, each function is realized by the cooperation of the hardware and a program executed on a processor such as a computer.

The control device H is configured to manage the container C having a frequency of being transported to the work area 9A equal to or greater than a first threshold value as a first type container C1, and the container C having a frequency less than the first threshold value and equal to or greater than a second threshold value as a second type container C2 based on the type of the article accommodated in each container. In the present embodiment, the control device H is configured to manage the container C in which a frequency of being transported to the work area 9A is less than the second threshold value as the general container C3. The above-described frequency of being transported is able to be expressed as a planned number of times of transport.

The first threshold value and the second threshold value are set based on a height of the necessity of performing target work (taking-out work of the article or inputting work of the article) in the work area 9A. Among the first type container C1, the second type container C2, and the general container C3, the first type container C1 in which a frequency of being transported to the work area 9A is the highest and is equal to or greater than the first threshold value is able to be said as having the necessity of performing target work in the work area 9A is high among these various containers C. Next, it is able to be said that the necessity of performing target work is high in the second type container C2 in which the frequency of being transported to the work area 9A is less than the first threshold value and is equal to or greater than the second threshold value. It is able to be said that the necessity of performing target work is relatively low in the various containers C is in the general container C3 in which the frequency of being transported to the work area 9A is less than the second threshold value.

In the present embodiment, the control device H is configured to periodically review the management of the first type container C1 and the second type container C2. In addition, in the present example, the control device H is configured to also periodically review the management of the general container C3. As a result, the container C determined as the first type container C1 is able to be changed to the second type container C2 or the general container C3. The same applies to the second type container C2 and the general container C3, and the container is able to be changed to another type of the container C by reviewing the management by the control device H. The period in which the review of the management is performed may be appropriately determined according to the use, the capacity, the scale, and the like of the container transport facility F.

Next, a configuration of the transport vehicle 100 will be described in detail. Hereinafter, a direction in which a traveling body 10 travels is referred to as a "vehicle body front-rear direction L", and a direction orthogonal to the vehicle body front-rear direction L in the up-down direction view is referred to as a "vehicle body width direction W".

As illustrated in FIG. 4, the transport vehicle 100 is configured to transport the containers C configured to be step-stackable in the up-down direction.

The transport vehicle 100 includes the traveling body 10 that travels, the support portion 2 that is mounted on the traveling body 10 and supports the plurality of containers C as the step-stacking container group Ge which is a container group in a step-stacked state, a first transfer device 4 that is mounted on the traveling body 10 and transfers the containers C between the storage shelf 8 and the step-stacking container group Ge supported by the support portion 2, and a second transfer device 22 that is mounted on the traveling body 10 and transfers the step-stacking container group Ge. In the present embodiment, the transport vehicle 100 further includes a lifting device 3 that is mounted on the traveling body 10 and is able to lift a part or all of the containers C of the step-stacking container group Ge supported by the support portion 2.

The traveling body 10 is configured to travel on a floor surface. The traveling body 10 includes a plurality of traveling wheels 11. The plurality of traveling wheels 11 include a pair of drive wheels 11$a$ that are disposed to be spaced apart from each other in the vehicle body width direction W, and a plurality of driven wheels 11$b$.

Each of the pair of drive wheels 11$a$ is independently driven by a wheel drive source (not illustrated), such as a motor. For example, the traveling body 10 is able to turn in place about an upper and lower axial center by rotationally driving each of the pair of drive wheels 11$a$ in opposite directions with respect to each other.

Each of the plurality of driven wheels 11$b$ is supported by the traveling body 10 so as to be rotatable about an axial center along the up-down direction. That is, the direction along the rotation axis of each of the driven wheels 11$b$ may be changed in a horizontal plane. In the present example, each of the driven wheels 11$b$ is configured as a caster.

The support portion 2 is configured to support the plurality of containers C as the step-stacking container group Ge in the step-stacked state. The support portion 2 is also able to support a single container C. In the present embodiment, a step-stacking region 2A in which the step-stacking container group Gc is disposed is defined above the support portion 2. The step-stacking region 2A is a three-dimensional imaginary region that extends upward from the support portion 2.

The second transfer device 22 is configured to transfer the step-stacking container group Gc supported by the support portion 2 along the vehicle body width direction W. The second transfer device 22 is configured by using a conveyor. As such a conveyor, a well-known conveyor such as a roller conveyor, a chain conveyor, or a belt conveyor may be used. In the present embodiment, the second transfer device 22 and the support portion 2 are integrally configured.

The lifting device 3 includes a lifting mast 30 that is erected upward from the traveling body 10, a lifting and lowering body 30B that is connected to the lifting mast 30, a frame member 31 that is connected to the lifting and lowering body 30B, and a lifting and lowering body drive unit (not illustrated) that lifts and lowers the lifting and lowering body 30B, and the frame member 31 along the lifting mast 30. Although detailed illustration is omitted, the lifting and lowering body drive unit is configured as, for example, a motor for rotationally driving a rotation body around which an endless body such as a belt is wound.

Figures 6, 7:
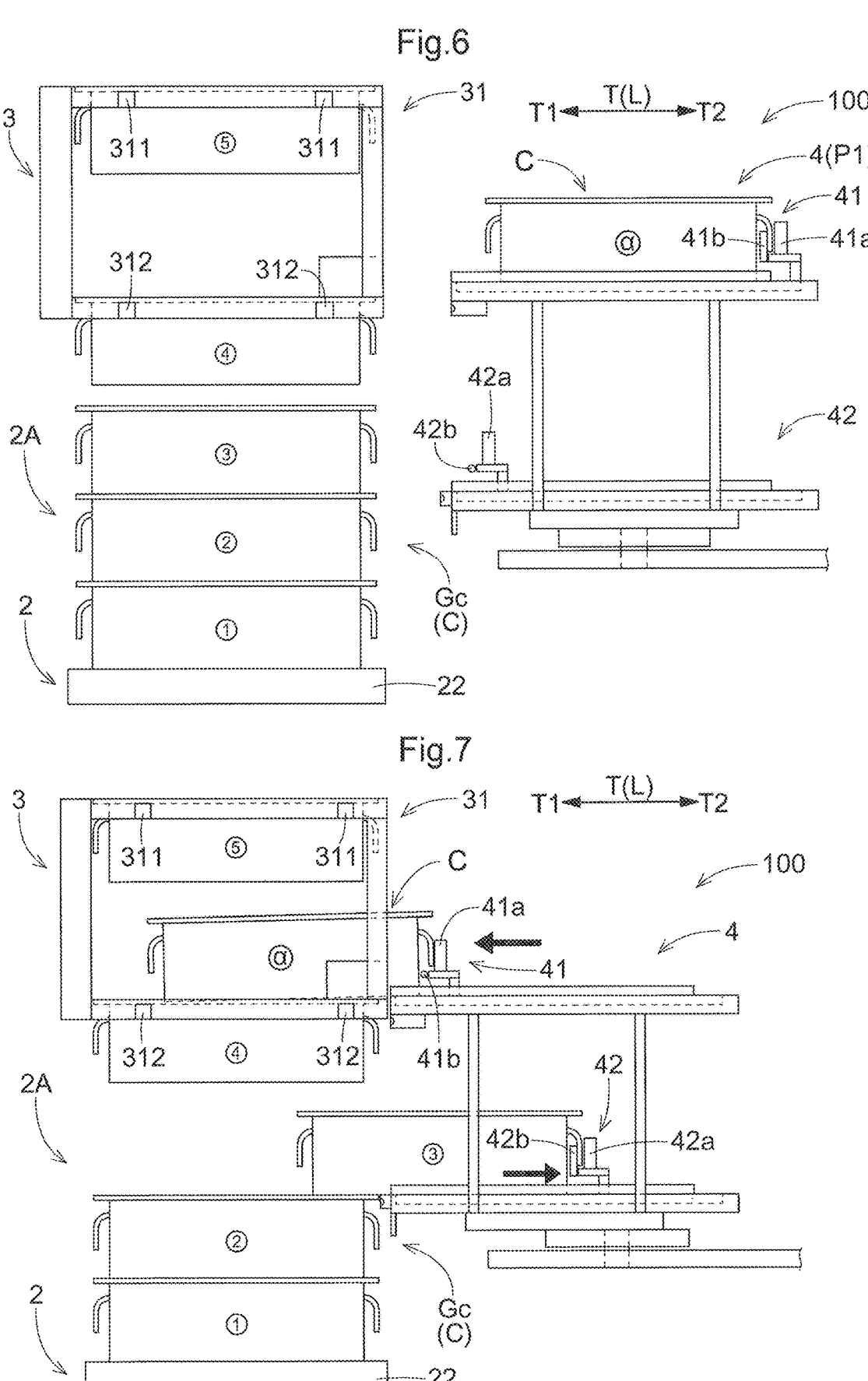
FIG. 6 is a view illustrating a transfer operation to a step-stacking region.
FIG. 7 is a view illustrating a transfer operation to the step-stacking region.

As illustrated in FIG. 6 and the like, in the present embodiment, the lifting device 3 includes a first lifting holding portion 311 that lifts the container C at any height in the step-stacking container group Gc step-stacked in the step-stacking region 2A to the container C adjacent to a container C below the container C, and a second lifting holding portion 312 that lifts the container C below the container C lifted by the first lifting holding portion 311 to the container C adjacent to a container C below the container C. The first lifting holding portion 311 and the second lifting holding portion 312 are supported by the frame member 31.

In the present embodiment, the first lifting holding portion 311 and the second lifting holding portion 312 are disposed to be spaced apart from each other in the up-down direction. As a result, it is possible to form a space between the container C lifted by the first lifting holding portion 311 and the container C lifted by the second lifting holding portion 312 in the up-down direction. In addition, it is possible to form a space in the up-down direction below the container C lifted by the second lifting holding portion 312.

As illustrated in FIG. 4, the first transfer device 4 includes a transfer mast 40 that is fixed to the traveling body 10 and is disposed along the up-down direction, a transfer lifting and lowering body 40B that lifts and lowers along the transfer mast 40, and a transfer lifting and lowering body drive unit (not illustrated) that lifts and lowers the transfer lifting and lowering body 40B along the transfer mast 40. Although detailed illustration is omitted, the transfer lifting and lowering body drive unit is configured, for example, as a motor for rotationally driving a rotation body around which an endless body such as a belt is wound.

In the present embodiment, the first transfer device 4 includes an upper transfer portion 41, a lower transfer portion 42 disposed below the upper transfer portion 41, and a turning device 5. The upper transfer portion 41, the lower transfer portion 42, and the turning device 5 are connected to the transfer lifting and lowering body 40B. The upper transfer portion 41 and the lower transfer portion 42 are configured to integrally lift and lower by the lifting and lowering of the transfer lifting and lowering body 40B, integrally turn about the upper and lower axial center by the turning device 5, and individually transfer the container C.

In the present embodiment, the first transfer device 4 is configured to transfer the container C along the horizontal direction by the upper transfer portion 41 and the lower transfer portion 42. In a case in which a direction in which the container C is transferred by the first transfer device 4 is defined as a "transfer direction T", in the example illustrated in FIG. 4, the transfer direction T is equal to the vehicle body front-rear direction L.

Figure 5:
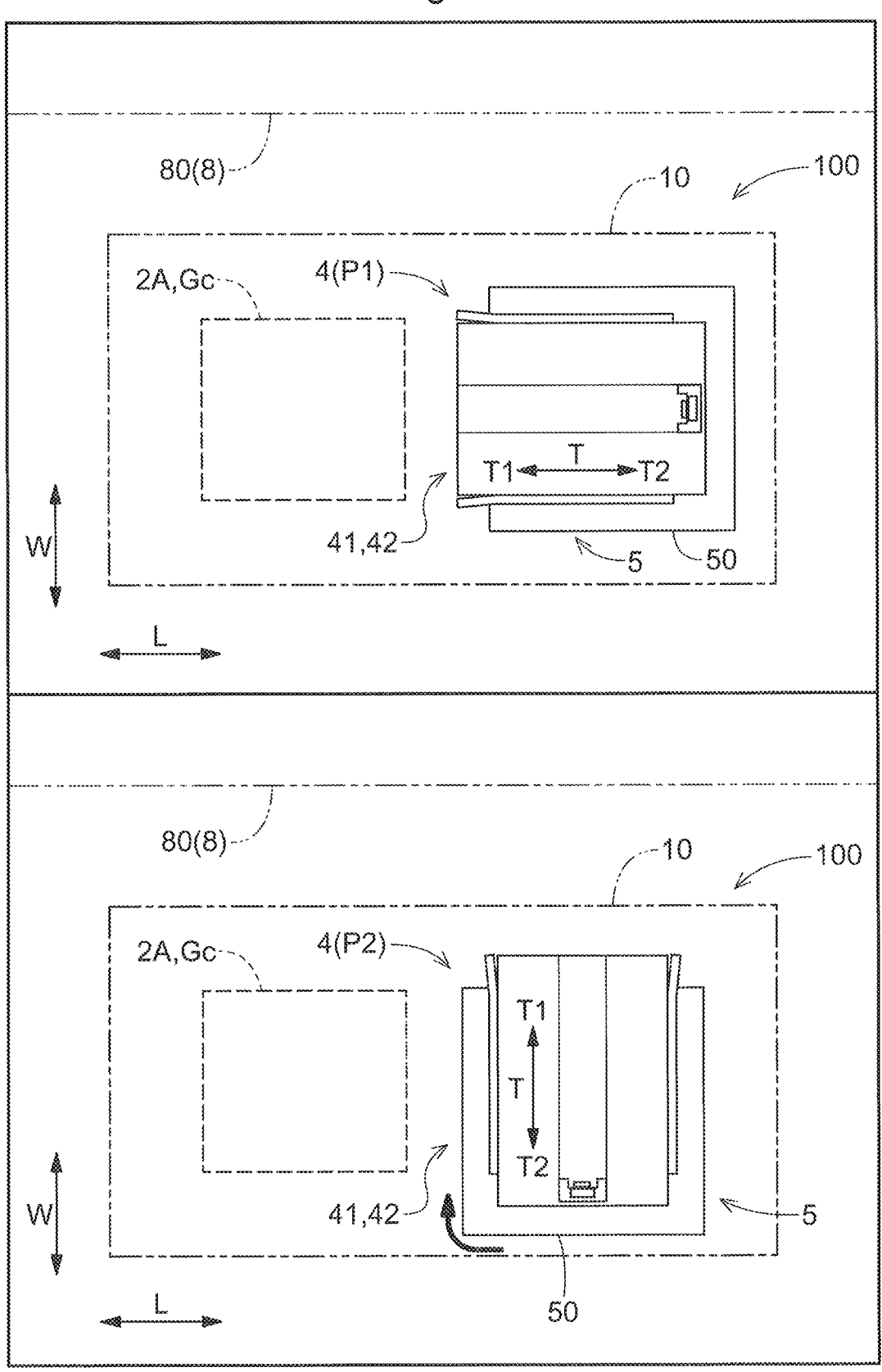
FIG. 5 is a plan view illustrating a first attitude and a second attitude of the transfer device.

As illustrated in FIG. 5, the first transfer device 4 is configured to change an attitude between a first attitude P1 in which the transfer direction T directs to the step-stacking region 2A and a second attitude P2 in which the transfer direction T directs to the storage shelf 8 by turning the upper transfer portion 41 and the lower transfer portion 42 around the up-down axial center by the turning device 5. As described above, in the present embodiment, the transfer direction T is able to be changed in the horizontal plane by the turning device 5.

In the present embodiment, the first transfer device 4 changes the attitude according to a position of a transfer target location. Specifically, the first transfer device 4 takes the first attitude P1 in a case in which the transfer target location is the step-stacking region 2A, and takes the second attitude P2 in a case in which the transfer target location is the storage shelf 8 (shelf portion 80). As illustrated in FIG. 4, in the present example, the turning device 5 includes a turning table 50 that supports the upper transfer portion 41 and the lower transfer portion 42, a turning shaft 51 that supports the turning table 50 to be turnable with respect to the transfer lifting and lowering body 40B, and a turning drive unit (not illustrated) that drives the turning shaft 51.

Next, a transfer operation in a case in which the first transfer device 4 transfers the container C between the step-stacking region 2A will be described with reference to FIGS. 6 to 8. The transfer operation includes a handover operation of handing over the container C and a receiving operation of receiving the container C. Hereinafter, one side in the transfer direction T is referred to as a "first side T1 in the transfer direction", and the other side is referred to as a "second side T2 in the transfer direction".

In the present embodiment, the upper transfer portion 41 includes an upper pressing portion 41a that presses the container C toward the first side T1 in the transfer direction in a case of performing the handover operation of the container C, and an upper locking portion 41b that is locked to the container C and pulls the container C toward the second side T2 in the transfer direction in a case of performing the receiving operation of the container C. As described above, in the present embodiment, the upper transfer portion 41 is configured in a so-called push-pull type. However, the upper transfer portion 41 is not limited to such a configuration, and may be configured in a fork type.

Similarly, the lower transfer portion 42 includes a lower pressing portion 42a that presses the container C toward the first side T1 in the transfer direction in a case of performing the handover operation of the container C, and a lower locking portion 42b that is locked to the container C and pulls the container C toward the second side T2 in the transfer direction in a case of performing the receiving operation of the container C. As described above, in the present embodiment, the lower transfer portion 42 is configured in a so-called push-pull type. However, the lower transfer portion 42 is not limited to such a configuration, and may be configured in a fork type.

In the present embodiment, each of the upper locking portion 41b and the lower locking portion 42b is configured to be driven by a drive unit (not illustrated) to change the attitude between a locking attitude in which each thereof is locked to the container C and a non-locking attitude in which each thereof is not locked to the container C.

FIGS. 6 to 8 illustrate a transfer operation of the container C to the step-stacking region 2A. As described above, in the present embodiment, the lifting device 3 is able to form spaces between the plurality of containers C step-stacked in the step-stacking region 2A in the up-down direction. Then, the first transfer device 4 transfers the container C to the step-stacking region 2A by using these spaces. In the present embodiment, the first transfer device 4 is configured to perform the handover operation and the receiving operation of the container C with respect to the step-stacking region 2A. The first transfer device 4 is able to perform a parallel operation of handing over and receiving the container C in parallel with respect to the step-stacking region 2A.

FIGS. 6 to 8 illustrate an example in which the containers C of five steps are step-stacked in the step-stacking region 2A as the step-stacking container group Gc. In the drawings, respective containers C step-stacked in a row from the bottom to the top are marked with the number of "1 to 5". In addition, a character "a" is added to the container C, which is the handover target, held by the upper transfer portion 41. In the example illustrated below, the container C (container "a") of the handover target is handed over to the fourth-step container C (container "4") by using a space formed between the fifth-step container C (container "5") and the fourth-step container C (container "4") in the up-down direction by the lifting device 3. In addition, in parallel with this, the third-step container C (container "3") is received by using a space formed below the fourth-step container C (container "4") by the lifting device 3.

As illustrated in FIG. 7, the first transfer device 4 moves the lower locking portion 42b in the locking attitude to the second side T2 in the transfer direction in a state in which the lower locking portion 42b is locked to the container C (container "3"). The first transfer device 4 moves the upper pressing portion 41a to the first side T1 in the transfer direction in a state in which the container C (container "a") held by the upper transfer portion 41 is pressed by the upper pressing portion 41a, in parallel with this. As a result, the lower locking portion 42b pulls the container C (container "3") of the receiving target to the second side T2 in the transfer direction, and the upper pressing portion 41a presses the container C (container "a") of the handover target to the first side T1 in the transfer direction.

Then, the lower transfer portion 42 receives the container C (container "3") as the receiving target, which is pulled in by the lower locking portion 42b, and the upper transfer portion 41 disposes the container C (container "a") as the handover target, which is pressed by the upper pressing portion 41a, above the container C (container "4") lifted by the second lifting holding portion 312 and fits it into the container C (container "4"). As a result, the step-stacking container group Gc in the step-stacking region 2A is in a state as illustrated in FIG. 8. That is, the container C (container "3") which is a part of the plurality of containers C disposed in the step-stacking region 2A is exchanged with the new container C (container "a").

As described above, the transport vehicle 100 is able to convert the step-stacking container group Gc supported by the support portion 2 into a new step-stacking container group Gc by the lifting device 3 and the first transfer device 4 cooperating with each other. For example, the transport vehicle 100 is able to create a new step-stacking container group Gc by removing a part of the containers C from the step-stacking container group Ge supported by the support portion 2 to use a plurality of containers C other than the removed container C. For example, the step-stacking container group Gc configured of only the first type container C1 is able to be created, the step-stacking container group Ge configured of only the second type container C2 is able to be created, or the step-stacking container group Gc configured of only the general container C3 is able to be created.

As illustrated in FIG. 1, in the present embodiment, the container transport facility F further includes a holding area 7A which is disposed at a region between the storage shelf 8 and the work area 9A, and includes the holding portion 70 that holds the step-stacking container group Gc. The holding area 7A is an area where the plurality of containers C are able to be held as the step-stacking container group Gc, unlike the storage shelf 8 for storing the plurality of containers C in a separated state.

In the present embodiment, the holding portion 70 is configured to be able to hold a plurality of step-stacking container groups Gc (see also FIG. 9). The holding area 7A includes a plurality of such holding portions 70.

As illustrated in FIGS. 9 and 10, the holding portion 70 is configured to enable the transfer of the step-stacking container group Gc between the holding portion 70 and the support portion 2 by the second transfer device 22 of the transport vehicle 100. In the present embodiment, the holding portion 70 includes one or a plurality of third transfer devices 73. In the illustrated example, the holding portion 70 includes three third transfer devices 73. In the present example, the third transfer device 73 is configured by using a conveyor. As such a conveyor, a well-known conveyor such as a roller conveyor, a chain conveyor, or a belt conveyor may be used.

The third transfer device 73 of the holding portion 70 and the second transfer device 22 of the transport vehicle 100 are configured to deliver the step-stacking container group Gc to each other. That is, in the present embodiment, the second transfer device 22 of the transport vehicle 100 is configured to be able to transfer the entire step-stacking container group Gc supported by the support portion 2 to the holding portion 70 and to transfer the entire step-stacking container group Gc held by the holding portion 70 to the support portion 2.

As illustrated in FIG. 10, in a state in which the transport vehicle 100 is stopped at a position adjacent to the holding portion 70 in the vehicle body width direction W, the step-stacking container group Gc, which is the transfer target, is transferred along the vehicle body width direction W. In the present embodiment, the transport vehicle 100 and the holding portion 70 are configured to be communicable with each other, and are configured to cooperate with each other to transfer the step-stacking container group Gc. For example, the transport vehicle 100 transmits a transfer signal for transferring the step-stacking container group Gc to the holding portion 70 in a state of being stopped at a position adjacent to the holding portion 70 in the vehicle body width direction W, and operates the second transfer device 22. The holding portion 70 that receives the transfer signal operates the third transfer device 73. As a result, the third transfer device 73 of the holding portion 70 and the second transfer device 22 of the transport vehicle 100 deliver the step-stacking container groups Gc each other.

As illustrated in FIG. 1, the holding area 7A is disposed in a region between the storage shelf 8 and the work area 9A. In the present embodiment, the holding area 7A is disposed in a region between the storage shelf 8 and the work area 9A in a direction in which the storage shelf 8 extends, that is, in a direction in which the shelf region inner path R8 extends.

In the present embodiment, the holding portion 70 of the holding area 7A is disposed at a position along a connection path R7 connecting the shelf region inner path R8 and the first delivery portion 91 of the work area 9A. The shelf region inner path R8 and the connection path R7 have a linear shape. In the present example, a plurality of shelf region inner paths R8 are provided in accordance with the number of the storage shelves 8, and the same number of connection paths R7 as the plurality of shelf region inner paths R8 are provided. Each of the plurality of holding portions 70 provided in the holding area 7A is disposed at a position along any of the plurality of connection paths R7.

Here, as illustrated in FIG. 1, in the container transport facility F according to the present disclosure, a step-stacking storage area 6A is provided at a location different from the work area 9A and the storage shelf 8. The step-stacking storage area 6A is an area in which a plurality of step-stacking container groups Ge is able to be stored.

As illustrated in FIG. 11, the step-stacking storage area 6A includes a disposition region 60 in which the plurality of step-stacking container groups Ge are able to be disposed, a second delivery portion 62 in which the step-stacking container group Gc is delivered between the second delivery portion 62 and the support portion 2 of the transport vehicle 100, and a container group transport device 63 that performs a taking-out operation of moving the step-stacking container group Gc from the disposition region 60 to the second delivery portion 62, and a taking-in operation of moving the step-stacking container group Gc from the second delivery portion 62 to the disposition region 60.

In the present embodiment, the step-stacking storage area 6A is configured to store the container C alone or the step-stacking container group Gc by being placed in the disposition region 60. In the present example, at least a part of a floor surface in the step-stacking storage area 6A is the disposition region 60.

Hereinafter, a configuration of the step-stacking storage area 6A will be described in which directions along a horizontal plane and orthogonal to each other are referred to as an X direction and a Y direction.

As illustrated in FIGS. 11 and 12, in the present embodiment, the container group transport device 63 includes a gripping mechanism 630 that grips the container C, an X-direction moving body 631X that moves the gripping mechanism 630 in the X direction, a Y-direction moving body 631Y that moves the gripping mechanism 630 in the Y direction, and a lifting and lowering mechanism 632 that lifts and lowers the gripping mechanism 630 along an up-down direction.

In the present embodiment, the container group transport device 63 includes a pair of fixed guide rails 631 fixed to the disposition region 60. Each of the pair of fixed guide rails 631 extends along the Y direction and is disposed to be spaced apart from each other in the X direction.

The Y-direction moving body 631Y is configured to be supported by the pair of fixed guide rails 631 and to move the gripping mechanism 630 along the Y direction. The X-direction moving body 631X is configured to be supported by the Y-direction moving body 631Y and to move the gripping mechanism 630 along the X direction. The lifting and lowering mechanism 632 is configured to be supported by the X-direction moving body 631X and to lift and lower the gripping mechanism 630 along the up-down direction.

In the present embodiment, the X-direction moving body 631X is configured of a carriage that travels along the movable rail constituting the Y-direction moving body 631Y. The X-direction moving body 631X travels along the Y-direction moving body 631Y extending along the X direction, and thus moves along the X direction.

The gripping mechanism 630 is supported by the X-direction moving body 631X. Therefore, the gripping mechanism 630 also moves along the X direction by moving the X-direction moving body 631X along the X direction. In addition, as described above, the X-direction moving body 631X is supported by the Y-direction moving body 631Y. Therefore, the gripping mechanism 630 also moves along the Y direction by moving the Y-direction moving body 631Y along the Y direction. In this way, the gripping mechanism 630 is configured to be movable along the X direction and the Y direction.

The lifting and lowering mechanism 632 is supported by the X-direction moving body 631X. Although detailed illustration is omitted, the lifting and lowering mechanism 632 includes a belt connected to the gripping mechanism 630 and a lifting and lowering drive unit (not illustrated) configured of, for example, a motor or the like and driving the belt. The belt is driven by the lifting and lowering drive unit, whereby the gripping mechanism 630 is lifted and lowered in the up-down direction. As described above, in the present embodiment, the gripping mechanism 630 is supported by the X-direction moving body 631X via the lifting and lowering mechanism 632.

As illustrated in FIG. 12, the gripping mechanism 630 includes a pair of gripping units 630U that are close to or space apart from each other in the X direction. The gripping mechanism 630 is in a gripping state of gripping the container C by the pair of gripping units 630U being close to each other. The gripping mechanism 630 is in a non-gripping state in which the container C is not gripped by the pair of gripping units 630U being spaced apart from each other.

Each of the pair of gripping units 630U is supported by the X-direction moving body 631X via the lifting and lowering mechanism 632 to be lifted and lowered in synchronization between the pair of rail portions 631Ya (see FIG. 11) of the Y-direction moving body 631Y. Each of the pair of gripping units 630U includes a pair of positioning tools 630a that are disposed side by side in the Y direction and are close to or spaced apart from each other in the Y direction, and a gripping tool 630b that is disposed between the pair of positioning tools 630a disposed side by side in the Y direction.

The pair of gripping units 630U are close to each other, so that the gripping tools 630b provided in each of the pair of gripping units 630U sandwich the container C from both sides. As a result, the container C is gripped. On the contrary, the pair of gripping units 630U are spaced apart from each other, so that the gripping of the container C is released.

In the present embodiment, the positioning tool 630a is configured to come into contact with an outer edge of the container C from the outside in the gripping state of the gripping mechanism 630 to position the container C. In the present example, the pair of positioning tools 630a provided in each of the pair of gripping units 630U, that is, the total of four positioning tools 630a are configured to come into contact with four corners of the container C having a rectangular planar shape. In the illustrated example, a plurality of positioning tools 630a are configured as columnar bodies having an L-shaped cross-sectional shape along the horizontal plane so as to match an outer edge shape of each of the four corners of the container C.

As illustrated in FIG. 11, in the present embodiment, the second delivery portion 62 includes a carrying-out conveyor 621 for carrying out the step-stacking container group Gc from the step-stacking storage area 6A, and a carrying-in conveyor 622 for carrying in the step-stacking container group Gc to the step-stacking storage area 6A.

The step-stacking container group Gc disposed in the disposition region 60 of the step-stacking storage area 6A is transported to the carrying-out conveyor 621 by the container group transport device 63. The step-stacking container group Gc is, for example, handed over to the transport vehicle 100 by the carrying-out conveyor 621.

For example, the step-stacking container group Gc transported to the carrying-in conveyor 622 by the transport vehicle 100 is handed over to the container group transport device 63 by the carrying-in conveyor 622. The step-stacking container group Gc is transported to the disposition region 60 by the container group transport device 63.

As illustrated in FIG. 13, the container group transport device 63 is configured to perform a separation operation of separating a part of the containers C (a plurality of or one container C) from one step-stacking container group Gc. The container group transport device 63 is able to create the step-stacking container group Gc configured of any number of containers C by performing the separation operation. The container group transport device 63 is configured to move a part of the containers C separated from one step-stacking container group Gc by the separation operation to a location different from a location where the one step-stacking container group Gc is disposed.

In the example illustrated in FIG. 13, the container group transport device 63 separates the plurality of containers C having the container type "A" from the step-stacking container group Gc configured of the plurality of containers C having the container type "A" and the plurality of containers C having the container type "B". Then, the container group transport device 63 transports the separated plurality of containers C (container type "A") to the second delivery portion 62. The plurality of containers C (container type "A") transported to the second delivery portion 62 are, for example, handed over to the transport vehicle 100 and transported to a target location by the transport vehicle 100.

As illustrated in FIG. 14, the container group transport device 63 is configured to perform a combination operation of combining the step-stacking container group Gc or the single container C with the other step-stacking container group Gc or the single container C. The container group transport device 63 is able to create the step-stacking container group Gc configured of any number of containers C by performing the combination operation. The container group transport device 63 is configured to move the step-stacking container group Gc created by the combination operation.

In the example illustrated in FIG. 14, the container group transport device 63 combines a part of the step-stacking container group Gc configured of the plurality of containers C having the container type "A", a part of the step-stacking container group Gc configured of the plurality of containers C having the container type "B", and a part of the step-stacking container group Gc configured of the plurality of containers C having the container type "D" by the combination operation. Then, the container group transport device 63 transports a new step-stacking container group Gc created by the combination operation to the second delivery portion 62. The step-stacking container group Gc transported to the second delivery portion 62 is, for example, handed over to the transport vehicle 100 and transported to the target place by the transport vehicle 100.

As illustrated in FIG. 1, the holding area 7A is disposed between the storage area 8A in which the storage shelf 8 is disposed and the work area 9A. In the present embodiment, the step-stacking storage area 6A is disposed to be adjacent to the holding area 7A.

In the present embodiment, the disposition region 60 is disposed at a position away from the connection path R7. The second delivery portion 62 is disposed at a position along the connection path R7. As a result, the step-stacking storage area 6A is able to be disposed at a position that does not hinder the traveling of the transport vehicle 100 traveling on the connection path R7 and that allows the delivery of the step-stacking container group Gc to the transport vehicle 100 traveling on the connection path R7.

In the present embodiment, the second transfer device 22 of the transport vehicle 100 is configured to be able to transfer the entire step-stacking container group Gc supported by the support portion 2 to the second delivery portion 62 and to transfer the entire step-stacking container group Gc held by the second delivery portion 62 to the support portion 2.

The step-stacking container group Gc, which is the transfer target, is transferred along the vehicle body width direction W in a state in which the transport vehicle 100 is stopped at a position adjacent to the second delivery portion 62 in the vehicle body width direction W. In the present embodiment, the transport vehicle 100 and the second delivery portion 62 are configured to be communicable with each other and are configured to cooperate with each other to transfer the step-stacking container group Gc. For example, the transport vehicle 100 transmits a transfer signal indicating the transfer of the step-stacking container group Gc to the second delivery portion 62 in a state of being stopped at a position adjacent to the second delivery portion 62 in the vehicle body width direction W, and operates the second transfer device 22. The second delivery portion 62 that receives the transfer signal operates the carrying-out conveyor 621 or the carrying-in conveyor 622. As a result, the second delivery portion 62 and the second transfer device 22 of the transport vehicle 100 deliver the step-stacking container group Gc to each other.

In the present embodiment, the transport vehicle 100 is configured to transport the step-stacking container group Gc from the storage shelf 8 to the work area 9A, to transport the step-stacking container group Gc from the step-stacking storage area 6A to the work area 9A, and to transport the step-stacking container group Gc from the holding area 7A to the work area 9A, respectively, based on an instruction from the control device H.

As illustrated in FIG. 15, in the present embodiment, the transport vehicle 100 is configured to transport the step-stacking container group Ge including the first type container C1 at least in part to the holding area, or to transport the step-stacking container group Gc which does not include the first type container C1 and includes the second type container C2 at least in part to the step-stacking storage area 6A, based on an instruction from the control device H. As a result, the first type container C1 having a high frequency of being transported to the work area 9A is able to be preferentially held in the holding area 7A. In addition, although the frequency of being transported to the work area 9A is less than that of the first type container C1, the second type container C2 having a relatively high frequency is able to be preferentially stored in the step-stacking storage area 6A. Therefore, the step-stacking container group Gc including the container C is able to be placed at an appropriate location according to the frequency of transportation of each container C to the work area.

In the example illustrated in FIG. 15(*a*), the transport vehicle 100 supports the step-stacking container group Gc configured of a plurality of first type containers C1. In this case, the control device H issues a transport instruction of designating the transport destination of the step-stacking container group Gc as the holding area 7A to the transport vehicle 100. The transport vehicle 100 transports the step-stacking container group Gc configured of the plurality of first type containers C1 to the holding area 7A based on an instruction from the control device H.

In the example illustrated in FIG. 15(*b*), the transport vehicle 100 supports the step-stacking container group Gc configured of a plurality of second type containers C2. In this case, the control device H issues a transport instruction of designating the transport destination of the step-stacking container group Gc as the step-stacking storage area 6A to the transport vehicle 100. The transport vehicle 100 transports the step-stacking container group Ge configured of the plurality of second type containers C2 to the step-stacking storage area 6A based on an instruction from the control device H.

As described above, in the present embodiment, the control device H is configured to periodically review the management of the first type container C1 and the second type container C2. In the present example, the transport vehicle 100 is configured to transport the step-stacking container group Gc between the holding area 7A and the step-stacking storage area 6A based on the instruction from the control device H after the review of the management of the container C, and to perform the exchange between the step-stacking container group Gc held by the holding portion 70 of the holding area 7A and the step-stacking container group Gc stored in the step-stacking storage area 6A.

That is, in a case in which, as a result of the review of the management by the control device H, the step-stacking container group Gc held by the holding portion 70 of the holding area 7A does not include the first type container C1 and includes the second type container C2 at least in part, the transport vehicle 100 transports the step-stacking container group Gc from the holding area 7A to the step-stacking storage area 6A.

In addition, in a case in which, as a result of the review of the management by the control device H, the step-stacking container group Ge stored in the step-stacking storage area 6A includes the first type container C1 at least in part, the transport vehicle 100 transports the step-stacking container group Gc from the step-stacking storage area 6A to the holding area 7A.

According to such a configuration, a state in which an appropriate step-stacking container group Gc is stored in each of the holding area 7A and the step-stacking storage area 6A is able to be maintained for a long period of time.

Second Embodiment

Next, a second embodiment of the container transport facility F will be described. The points that are not particularly described are the same as those in the first embodiment.

As illustrated in FIG. 16, in the present embodiment, the container transport facility F further includes an inter-area transport device 200 that transports the step-stacking container group Gc between the step-stacking storage area 6A and the work area 9A.

In the present embodiment, the inter-area transport device 200 is configured by using a conveyor. The inter-area transport device 200 forms a transport path connecting the step-stacking storage area 6A and the work area 9A. In the present example, the transport path is formed such that the step-stacking storage area 6A and the work area 9A are connected without passing through the holding area 7A. In the present example, the inter-area transport device 200 includes a carrying-out portion 201 for carrying out the step-stacking container group Ge from the step-stacking storage area 6A and a carrying-in portion 202 for carrying in the step-stacking container group Gc to the step-stacking storage area 6A. The transport path formed by the inter-area transport device 200 is in a loop shape that returns from the carrying-out portion 201 to the carrying-in portion 202 through the work area 9A.

The step-stacking container group Gc carried out from the carrying-out portion 201 is handed over to the work area 9A, and target work is performed in the work area 9A. The step-stacking container group Gc (or the single container C) that has finished target work in the work area 9A is transported by the inter-area transport device 200 and reaches the carrying-in portion 202. The step-stacking container group Gc (or the single container C) that has reached the carrying-in portion 202 is handed over to the step-stacking storage area 6A.

With such a configuration, the step-stacking container group Ge in the step-stacking storage area 6A is able to be transported to the work area 9A without using the transport vehicle 100. In addition, the step-stacking container group Gc (or the single container C) in the work area 9A is able to be transported to the step-stacking storage area 6A without using the transport vehicle 100.

Other Embodiments

Hereinafter, other embodiments will be described.

(1) In the embodiment described above, an example is described in which the second delivery portion 62 of the step-stacking storage area 6A includes the carrying-out conveyor 621 and the carrying-in conveyor 622. However, the present invention is not limited to such an example, and the second delivery portion 62 may include a placement table on which the step-stacking container group Gc is simply placed.

(2) In the embodiment described above, an example is described in which the step-stacking storage area 6A is disposed between the storage area 8A where the storage shelf 8 is disposed and the work area 9A. However, the present invention is not limited to such an example, and a part of the storage area 8A may overlap with a part of the step-stacking storage area 6A. According to this configuration, the container C stored in the shelf portion 80 of the uppermost step of the storage shelf 8 is able to be received by the container group transport device 63 of the step-stacking storage area 6A. In addition, the container C stored in the step-stacking storage area 6A is able to be handed over to the shelf portion 80 of the uppermost step of the storage shelf 8 by the container group transport device 63. An aspect in which the step-stacking storage area 6A is provided to partially overlap with the storage area 8A in this manner also includes an aspect in which "the step-stacking storage area 6A is provided at a location different from the work area 9A and the storage shelf 8".

(3) In the embodiment described above, an example is described in which the shelf region inner path R8 and the connection path R7 have a linear shape. However, the present invention is not limited to such examples, and at least one of the shelf region inner path R8 or the connection path R7 may have a curved shape or a bent shape.

(4) In the embodiment described above, an example is described in which the second transfer device 22 is configured by using the conveyor. However, the present invention is not limited to such an example, and the second transfer device 22 may be configured by using a fork. Alternatively, the second transfer device 22 may be configured by using a robot arm.

(5) In the embodiment described above, an example is described in which the third transfer device 73 is configured by using the conveyor. However, the present invention is not limited to such an example, and the third transfer device 73 may be configured by using, for example, a robot arm.

(6) In the embodiment described above, an example is described in which the container transport facility F includes the holding area 7A. However, the present invention is not limited to such examples, and the container transport facility F may not include the holding area 7A.

(7) In addition, the configuration disclosed in the above embodiment is able to be applied in combination with the configuration disclosed in another embodiment as long as no contradiction occurs. The other configurations are also merely examples in all aspects of the embodiments disclosed in the present specification. Accordingly, various modifications are able to be appropriately made without departing from the spirit of the present disclosure.

Summary of Present Embodiment

Hereinafter, a summary of the present embodiment will be described.

A container transport facility including a transport vehicle configured to transport at least one container that is configured to be step-stacked in an up-down direction; a storage shelf configured to store the container; and a work area in which target work, which is at least one of taking-out work of an article from the container and inputting work of the article into the container, is performed, in which the at least one container includes a plurality of containers, the storage shelf is configured to include a plurality of steps of a shelf portion that supports each container in the up-down direction, and store the plurality of containers in a state of being separated from each other, the transport vehicle includes a traveling body configured to travel, a support portion configured to be mounted on the traveling body and support the plurality of containers as at least one step-stacking container group which is a container group in a step-stacked state, a first transfer device configured to be mounted on the traveling body and transfer the containers between the storage shelf and the step-stacking container group supported by the support portion, and a second transfer device configured to be mounted on the traveling body and transfer the step-stacking container group, the work area is provided with a first delivery portion through which the step-stacking container group is delivered between the first delivery portion and the support portion, a step-stacking storage area is provided at a location different from the work area and the storage shelf, and the at least one step-stacking container group includes a plurality of step-stacking container groups, the step-stacking storage area includes a disposition region in which the plurality of step-stacking container groups are able to be disposed, a second delivery portion in which the step-stacking container group is delivered between the second delivery portion and the support portion, and a container group transport device configured to perform a taking-out operation of moving the step-stacking container group from the disposition region to the second delivery portion and a taking-in operation of moving the step-stacking container group from the second delivery portion to the disposition region.

According to the present configuration, the step-stacking storage area is able to be used to temporarily store the step-stacking container group.

Therefore, for example, by storing a specific container in the step-stacking storage area, such as a container for which transportation to the work area is scheduled or a container with a high frequency to be transported to the work area, the work frequency of the transport vehicle for returning the container to the storage shelf or taking out the container from the storage shelf is able to be suppressed to be small.

Therefore, it is easy to improve the transport efficiency of the container by the transport vehicle. In addition, according to the present configuration, since the step-stacking storage area stores the step-stacking container group, the plurality of containers in a step-stacked state is able to be transferred at once between the support portion of the transport vehicle and the second delivery portion of the step-stacking storage area. Further, the delivery of the step-stacking container group is performed even in the first delivery portion of the work area. Therefore, it is easy to improve the transport efficiency of the container by the transport vehicle even at these points.

It is preferable that the container group transport device is configured to perform a separation operation of separating a part of the containers from one step-stacking container group and a combination operation of combining the step-stacking container group or a single container with another step-stacking container group or a single container.

According to the present configuration, the combination of the containers constituting the step-stacking container group in the step-stacking storage area is able to be changed for the step-stacking container group. As a result, the step-stacking container group having a combination of containers different from the step-stacking container group received from the transport vehicle is able to be newly created in the step-stacking storage area, and the created step-stacking container group is able to be transferred from the second delivery portion to the transport vehicle. Therefore, it is easy to transport the step-stacking container group in which the plurality of containers are appropriately combined to the work area according to the necessity in the work area, and it is easy to improve the efficiency of work in the work area.

It is preferable that the inter-area transport device that transports the step-stacking container group is further provided between the step-stacking storage area and the work area.

According to the present configuration, the step-stacking container group in the step-stacking storage area is able to be transported to the work area without using the transport vehicle, or the step-stacking container group in the work area is able to be transported to the step-stacking storage area without using the transport vehicle. In addition, the inter-area transport device is able to transport the step-stacking container group together. Therefore, it is easy to improve the transport efficiency of the container in the entire container transport facility.

It is preferable that the container transport facility further includes a holding area that is disposed in a region between the storage shelf and the work area, and includes a holding portion that holds the step-stacking container group, in which the holding portion is configured to transfer the step-stacking container group between the holding portion and the support portion by the second transfer device.

According to the present configuration, the step-stacking container group is able to be held in the holding area. Therefore, for example, by holding a specific container in the holding area, such as a container for which transportation to the work area is scheduled or a container with a high frequency of transportation to the work area, the work frequency of the transport vehicle for returning the container to the storage shelf or taking out the container from the storage shelf is suppressed to be small, and it is easy to improve the transport efficiency of the container by the transport vehicle. In addition, according to the present configuration, the plurality of containers are held in a step-stacked state in the holding area, so that it is easy to suppress a floor area occupied by the holding area to be small.

It is preferable that a path of the transport vehicle extending along the storage shelf is a shelf region inner path, the holding portion of the holding area is disposed at a position along a connection path connecting the shelf region inner path and the first delivery portion, the disposition region is disposed at a position away from the connection path, and the second delivery portion is disposed at a position along the connection path.

According to the present configuration, the step-stacking storage area is able to be disposed at a position at which the step-stacking container group is able to be delivered to the transport vehicle that travels the connection path without hindering the travel of the transport vehicle that travels the connection path connecting the storage shelf and the first delivery portion. In addition, according to the present configuration, the transport vehicle that travels the connection path is able to appropriately perform both the delivery of the step-stacking container group between the transport vehicle and the holding portion of the holding area, and the delivery of the step-stacking container group between the transport vehicle and the second delivery portion of the step-stacking storage area.

It is preferable that the container transport facility further includes a control system that controls the transport vehicle, in which the transport vehicle transports the step-stacking container group from the storage shelf to the work area, transports the step-stacking container group from the step-stacking storage area to the work area, and transports the step-stacking container group from the holding area to the work area, respectively, based on an instruction from the control system.

According to the present configuration, the container stored in the storage shelf is able to be transported to the work area by the transport vehicle as the step-stacking container group, and the step-stacking container group stored in the step-stacking storage area and the step-stacking container group held in the holding area are also able to be appropriately transported to the work area by the transport vehicle.

It is preferable that the container transport facility further includes a control system that controls the transport vehicle, in which the control system is configured to manage the container of which a frequency of being transported to the work area is equal to or greater than a first threshold value as a first type container and the container of which the frequency is less than the first threshold value and equal to or greater than a second threshold value as a second type container based on a type of the article accommodated in each of the containers, and the transport vehicle transports the step-stacking container group including the first type container at least in part to the holding area, or transports the step-stacking container group which does not include the first type container and includes the second type container at least in part to the step-stacking storage area, based on an instruction from the control system.

According to the present configuration, the first type container having a high frequency of being transported to the work area is able to be preferentially held in the holding area. In addition, although the frequency of being transported to the work area is less than that of the first type container, the second type container having a relatively high frequency is able to be preferentially stored in the step-stacking storage area. Therefore, the step-stacking container group including the container is able to be placed at an appropriate location according to the frequency of transportation of each container to the work area. Therefore, it is easy to improve the transport efficiency of the container by the transport vehicle.

It is preferable that the control system periodically reviews the management of the first type container and the second type container, and the transport vehicle transports the step-stacking container group between the holding area and the step-stacking storage area and performs an exchange between the step-stacking container group held by the holding portion of the holding area and the step-stacking container group stored in the step-stacking storage area based on an instruction from the control system after the review of the management.

According to the present configuration, a state in which an appropriate step-stacking container group is stored in each of the holding area and the step-stacking storage area is able to be maintained for a long period of time.

The technique according to the present disclosure is able to be applied to a container transport facility including a transport vehicle that transports a container that is configured to be step-stacked in an up-down direction, a storage shelf that stores the container, and a work area in which target work, which is at least one of taking-out work of an article from the container and inputting work of the article into the container, is performed.

DESCRIPTION OF THE REFERENCE NUMERALS

F: container transport facility
100: transport vehicle

10: traveling body
2: support portion
22: second transfer device
4: first transfer device
6A: step-stacking storage area
60: disposition region
62: second delivery portion
63: container group transport device
7A: holding area
70: holding portion
8A: storage area
8: storage shelf
80: shelf portion
9A: work area
91: first delivery portion
200: inter-area transport device
C: container
C1: first type container
C2: second type container
Gc: step-stacking container group
R7: connection path
R8: shelf region inner path

What is claimed is:

1. A container transport facility, comprising:
a transport vehicle configured to transport at least one container that is configured to be step-stacked in an up-down direction;
a storage shelf configured to store the container; and
a work area in which target work, which is at least one of taking-out work of an article from the container and inputting work of the article into the container, is performed, and wherein:

the at least one container comprises a plurality of containers, with the storage shelf configured with a plurality of steps of a shelf portion that supports each container in the up-down direction, and store the plurality of containers in a separated state from each other, the transport vehicle comprises:
a traveling body configured to travel,
a support portion configured to be mounted on the traveling body and support the plurality of containers as at least one step-stacking container group which is a container group in a step-stacked state,
a first transfer device configured to be mounted on the traveling body and transfer the containers between the storage shelf and the step-stacking container group supported by the support portion, and
a second transfer device configured to be mounted on the traveling body and transfer the step-stacking container group, the work area is provided with a first delivery portion through which the step-stacking container group is delivered between the first delivery portion and the support portion, a step-stacking storage area is provided at a location different from the work area and the storage shelf, and the at least one step-stacking container group comprises a plurality of step-stacking container groups, the step-stacking storage area comprising:
a disposition region in which the plurality of step-stacking container groups are able to be disposed,
a second delivery portion in which the step-stacking container group is delivered between the second delivery portion and the support portion, and
a container group transport device configured to perform a taking-out operation of moving the step-stacking container group from the disposition region to the second delivery portion and a taking-in operation of moving the step-stacking container group from the second delivery portion to the disposition region.

2. The container transport facility according to claim 1, wherein the container group transport device is configured to perform a separation operation of separating a part of the containers from one step-stacking container group and a combination operation of combining the step-stacking container group or a single container with another step-stacking container group or a single container.

3. The container transport facility according to claim 1, further comprising:
    an inter-area transport device configured to transport the step-stacking container group between the step-stacking storage area and the work area.

4. The container transport facility according to claim 1, further comprising:
    a holding area configured to be disposed in a region between the storage shelf and the work area and that comprises a holding portion configured to hold the step-stacking container group, and
    wherein the holding portion is configured to transfer the step-stacking container group between the holding portion and the support portion by the second transfer device.

5. The container transport facility according to claim 4, wherein:
    a path of the transport vehicle extending along the storage shelf is defined as a shelf region inner path,
    the holding portion of the holding area is disposed at a position along a connection path connecting the shelf region inner path and the first delivery portion,
    the disposition region is disposed at a position away from the connection path, and
    the second delivery portion is disposed at a position along the connection path.

6. The container transport facility according to claim 4, further comprising:

a control system configured to control the transport vehicle, and
    wherein the transport vehicle transports the step-stacking container group from the storage shelf to the work area, transports the step-stacking container group from the step-stacking storage area to the work area, and transports the step-stacking container group from the holding area to the work area, respectively, based on an instruction from the control system.

7. The container transport facility according to claim 4, further comprising:
    a control system configured to control the transport vehicle, and
    wherein the control system is configured to manage the container of which a frequency of being transported to the work area is equal to or greater than a first threshold value as a first type container and the container of which the frequency is less than the first threshold value and equal to or greater than a second threshold value as a second type container based on a type of the article accommodated in each of the containers, and
    wherein the transport vehicle transports the step-stacking container group including the first type container at least in part to the holding area, or transports the step-stacking container group which does not include the first type container and includes the second type container at least in part to the step-stacking storage area based on an instruction from the control system.

8. The container transport facility according to claim 7, wherein the control system periodically reviews the management of the first type container and the second type container, and
    wherein the transport vehicle transports the step-stacking container group between the holding area and the step-stacking storage area, and performs an exchange between the step-stacking container group held by the holding portion of the holding area and the step-stacking container group stored in the step-stacking storage area based on an instruction from the control system after the review of the management.

* * * * *